United States Patent
Neumann et al.

(10) Patent No.: US 11,988,334 B2
(45) Date of Patent: May 21, 2024

(54) HYDROGEN STORAGE DEVICE AND A METHOD FOR PRODUCING A HYDROGEN STORAGE DEVICE

(71) Applicant: GKN Hydrogen GmbH, Bonn (DE)

(72) Inventors: Bettina Neumann, Radevormwald (DE); Nils Bornemann, Bonn (DE)

(73) Assignee: GKN HYDROGEN GMBH, Bonn (DE)

( * ) Notice: Subject to any disclaimer, the term of this patent is extended or adjusted under 35 U.S.C. 154(b) by 734 days.

(21) Appl. No.: 16/977,544

(22) PCT Filed: Feb. 26, 2019

(86) PCT No.: PCT/EP2019/054752
§ 371 (c)(1),
(2) Date: Sep. 2, 2020

(87) PCT Pub. No.: WO2019/166441
PCT Pub. Date: Sep. 6, 2019

(65) Prior Publication Data
US 2021/0003257 A1    Jan. 7, 2021

(30) Foreign Application Priority Data
Mar. 2, 2018  (DE) ................ 10 2018 104 830.0

(51) Int. Cl.
*C01B 3/00* (2006.01)
*F17C 11/00* (2006.01)

(52) U.S. Cl.
CPC .......... *F17C 11/005* (2013.01); *C01B 3/0078* (2013.01); *C01B 3/0084* (2013.01); *F17C 2221/012* (2013.01)

(58) Field of Classification Search
CPC .. F17C 11/00; F17C 11/005; F17C 2221/012; C01B 3/0078; C01B 3/0084; Y02E 60/32; B01D 53/04
(Continued)

(56) References Cited

U.S. PATENT DOCUMENTS 4,134,491 A * 1/1979 Turillon ............... F17C 11/005
220/88.1
4,598,836 A * 7/1986 Wessel ................. C01B 3/0005
220/88.1
(Continued)

FOREIGN PATENT DOCUMENTS

DE    102014006368 A1    11/2015
FR    2331747 A1    6/1977
(Continued)

OTHER PUBLICATIONS

Machine-generated English translation of JP 2017-519705 A, published Jul. 2017.*
(Continued)

Primary Examiner — Frank M Lawrence, Jr.
(74) Attorney, Agent, or Firm — Dority & Manning, P.A.

(57) ABSTRACT

A hydrogen storage device at least comprising a container with a first volume. A bulk material is arranged in the container, the bulk material comprising at least a plurality of pellets produced by a pressing method. Each pellet comprising at least a first material capable of storing hydrogen and a second material as binder for the first material provided in powder form prior to production by way of a pressing method.

12 Claims, 3 Drawing Sheets

Figure 1:
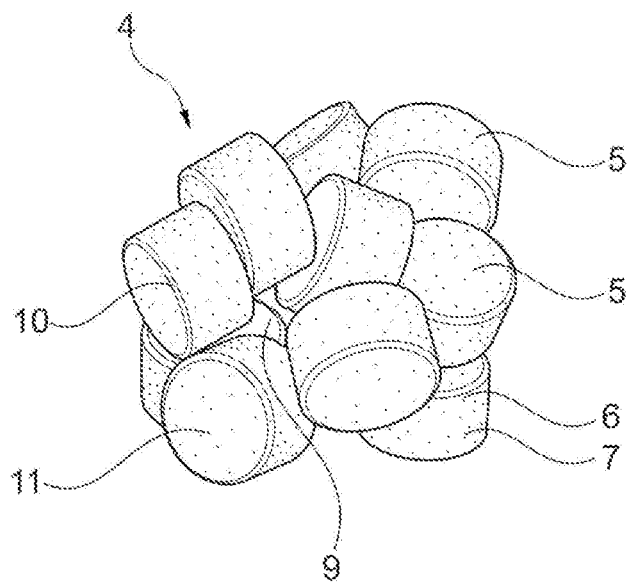

(58) Field of Classification Search
USPC .......... 96/108; 423/658.2; 206/0.7; 420/900
See application file for complete search history.

(56) References Cited

U.S. PATENT DOCUMENTS

| | | | |
|---|---|---|---|
| 4,667,815 A * | 5/1987 | Halene | F17C 11/005 |
| | | | 53/400 |
| 5,360,461 A | 11/1994 | Meinzer | |
| 5,443,616 A | 8/1995 | Congdon | |
| 5,662,729 A | 9/1997 | Nishimura | |
| 9,757,710 B1 * | 9/2017 | Xu | B01J 20/226 |
| 2006/0237688 A1 | 10/2006 | Zimmermann | |

FOREIGN PATENT DOCUMENTS

| | | | |
|---|---|---|---|
| JP | H08109402 A | | 4/1996 |
| JP | H09255301 A | | 9/1997 |
| JP | 2017-519705 A | * | 7/2017 |
| WO | 2015169740 A1 | | 11/2015 |
| WO | 2015169747 A1 | | 11/2015 |

OTHER PUBLICATIONS

International Searching Authority. International Search Report and Written Opinion for application PCT/EP2019/054752, dated May 29, 2019. With translation. 21 pages.
Japan Patent Office, Notice of Reasons for Refusal, Application No. 2020-545694, dated May 17, 2022, 14 pages.

* cited by examiner

HYDROGEN STORAGE DEVICE AND A METHOD FOR PRODUCING A HYDROGEN STORAGE DEVICE

The invention relates to a hydrogen storage device and to a method of producing a hydrogen storage device.

WO 2015/169740 A1 discloses a hydrogen storage element for a hydrogen storage means. The hydrogen storage element has been produced by compression and comprises a hydrogen-storing material and a heat-conducting material. Such hydrogen storage elements are stacked or geometrically fixed relative to one another, and thus give rise to a hydrogen storage device. The individual layers of the hydrogen storage elements are aligned relative to one another and functionally connected to one another, for example for conduction of heat, for passage of hydrogen, etc.

Numerous standards are applicable internationally to such hydrogen storage devices, which define, for example, the shape of the containers that accommodate the hydrogen-storing material. For that reason, hydrogen storage elements should be produced according to the shape of the stipulated container.

Proceeding from this, it is an object of the present invention to at least partly solve the problems outlined with regard to the prior art. More particularly, a hydrogen storage device and a method of producing a hydrogen storage device are to be proposed, by means of which fulfillment of the regulations can be enabled with maximum ease and at minimum cost.

This object is achieved by provision of a hydrogen storage device as disclosed herein and of a method as disclosed herein. The features detailed individually in the claims are combinable with one another in a technologically sensible manner and may be supplemented by additional matter from the description and details from the figures, indicating further embodiments of the invention.

A contribution to this is made by a hydrogen storage device comprising at least one container having a first volume, with a bulk material disposed in the container. The bulk material comprises at least a multitude of compacts produced by compression, wherein each compact comprises at least a first material capable of storing hydrogen and a second material as binder for the first material that was in pulverulent form before the production by compression.

The term "bulk material" refers to granular matter or else matter in pieces in a pourable form. The properties of the bulk material are determined via the grain size and grain distribution, and also the bulk density, the angle of repose, the moisture content and the temperature. A bed, especially the loose bed, refers to goods that can move freely within a receptacle or are not secured in position in some other way. Orientation of the constituents of the bulk material relative to one another or, for example, to the container with the first volume is not laid down.

A compact is an element produced by pressing. For this purpose, a pulverulent first material is filled into a press mold, here together with the second material that is especially likewise provided in pulverulent form, and compressed by means of rams that are movable toward one another under a pressure of at least 50 MPa [megapascal], especially of at least 100 MPa, especially in an isostatic manner, to give a compact.

Preference is given to hot pressing in which temperatures of at least 50 degrees Celsius, especially of at least 70 degrees Celsius, preferably of at least 100 degrees Celsius, are generated in the compact. In particular, in the course of hot pressing, a temperature that corresponds essentially to or varies by not more than 20 Kelvin from the melting temperature of the second material used is set. Owing to the elevated temperature, the second material may be at least partly melted, such that better bonding of the first material and second material is effected.

The proportion of the second material is especially between 1% and 5% by weight.

What is proposed here is not to fit the material capable of storing hydrogen to the shape of the container envisaged for the arrangement of the material capable of storing hydrogen, but to provide it in the form of bulk material. The bulk material is introduced into the container of virtually any shape, and is arranged therein. Interstices are formed here between the compacts, which, in the course of intercalation and release of hydrogen, are variable in relation to their size to compensate for the change in size of the compacts.

The first material capable of storing hydrogen and the second material as binder are known, for example, from WO 2015/169740 A1. The second material used is especially at least one polymer.

The use of at least one polymer can impart particular optical, mechanical, thermal and/or chemical properties to the compact. For example, the compact, by virtue of the polymer, may have good thermal stability, resistance to the surrounding medium (oxidation stability, corrosion resistance), good conductivity, good hydrogen absorptivity and storability, or other properties, for example mechanical strength, that would not otherwise be possible without the polymer. It is also possible to use polymers which, for example, do not enable storage of hydrogen but on the other hand enable high elongation, for example polyamide or polyvinylacetates.

More particularly, the polymer may be a homopolymer or a copolymer. Copolymers are polymers composed of two or more different monomer units.

The polymer (homopolymer) preferably includes a monomer unit which, as well as carbon and hydrogen, preferably further includes at least one heteroatom selected from sulfur, oxygen, nitrogen and phosphorus, such that the polymer obtained, by contrast with polyethylene, for example, is not entirely nonpolar. It is also possible for at least one halogen atom selected from chlorine, bromine, fluorine, iodine and astatine to be present. The polymer is preferably a copolymer in which there is at least one monomer unit, as well as carbon and hydrogen, further includes at least one heteroatom selected from sulfur, oxygen, nitrogen and phosphorus and/or at least one halogen atom selected from chlorine, bromine, fluorine, iodine and astatine. At the same time, it is also possible that two or more monomer units have a corresponding heteroatom and/or halogen atom.

The polymer preferably has adhesive properties with respect to the first material. This means that it has very good adhesion to the first material itself and hence forms a matrix that adheres in a stable manner to the first material even under stresses as they occur during hydrogen storage.

The adhesive properties of the polymer enable high stability of the compact over a maximum period of time, i.e. over multiple cycles of hydrogen storage and hydrogen release. A cycle describes the process of a single hydrogenation and subsequent dehydrogenation. The compact should preferably be stable over at least 500 cycles, especially over at least 1000 cycles, for the material to be economically usable. What is meant by "stable" in the context of the present invention is that the amount of hydrogen that can be stored and the rate (speed) at which the hydrogen is stored corresponds essentially to the values at the start of the use of the compact even after 500 or 1000 cycles. More particularly, what is meant by "stable" is that the first material is retained at least approximately at the position within the compact where it was originally disposed.

"Stable" should also be understood to mean that no separation effects occur during the cycles, in which finer particles separate and move away from coarser particles (for example from the compact).

The first material is especially a low-temperature hydrogen storage material. In the storage of hydrogen, which is an exothermic process, therefore, temperatures of up to 150° C. occur. A polymer which is used here as the second material must be stable at these temperatures. A preferred polymer therefore does not decompose up to a temperature of 180° C., especially up to a temperature of 165° C., especially of up to 145° C.

More particularly, the polymer is selected from EVA, PMMA, EEAMA and mixtures of these polymers.

EVA (ethyl-vinyl acetate) refers to a group of copolymers of ethylene and vinyl acetate that have a proportion of vinyl acetate in the range from 2% by weight to 50% by weight. Smaller proportions of vinyl acetate lead to formation of hard films, whereas higher proportions of vinyl acetate lead to greater adhesiveness of the polymer. Typical EVAs are solid at room temperature and have elongation at break of up to 750%. Moreover, EVAs are resistant to stress cracking.

Polymethylmethacrylate (PMMA) is a synthetic, transparent thermoplastic. The glass transition temperature, depending on the molar mass, is about 45° C. to 130° C. The softening temperature is preferably 80° C. to 120° C., especially 90° C. to 110° C. The thermoplastic copolymer is notable for its resistance to weathering, light and UV radiation.

EEAMA is a terpolymer (copolymer) of ethylene, acrylic ester and maleic anhydride monomer units. EEAMA has a melting point of about 102° C., depending on the molar mass.

The compact preferably comprises exclusively the first material and the second material, i.e. the first material capable of storing hydrogen and the binder. The proportion by weight of the second material based on the total weight of the compact is preferably not more than 10% by weight, especially not more than 5% by weight, preferably not more than 2% by weight. The proportion by weight of the binder in the compact should be at a minimum. Even though the binder may be capable likewise of storing hydrogen, the hydrogen storage capacity is nevertheless not as marked as that of the first material (especially not more than 20% of the hydrogen storage capacity). However, the binder may firstly reduce or completely prevent any oxidation of the first material that occurs, and secondly assures cohesion between the pulverulent particles of the first material in the compact.

The first material may comprise, preferably consist of, at least one hydrogenatable metal and/or at least one hydrogenatable metal alloy. The following materials may additionally be used as the hydrogenatable first material: alkaline earth metal and alkali metal alanates, alkaline earth metal and alkali metal borohydrides, metal-organic frameworks (MOFs) and/or clathrates, and also, of course, respective combinations of the respective materials. The first material may also comprise non-hydrogenatable metals or metal alloys.

According to the invention, the first material may comprise a low-temperature hydride and/or a high-temperature hydride. The term "hydride" here refers to the hydrogenatable material, regardless of whether it is in the hydrogenated form or the non-hydrogenated form. Low-temperature hydrides store hydrogen preferably within a temperature range between −55° C. to 180° C., especially between −20° C. and 150° C., particularly between 0° C. and 140° C. High-temperature hydrides store hydrogen preferably within a temperature range from 280° C. upward, especially from 300° C. upward. At the temperatures mentioned, the hydrides can not only store hydrogen but also release it, i.e. are capable of working within these temperature ranges.

Where 'hydrides' are described in this connection, this is understood to mean the hydrogenatable material both in its hydrogenated form and in its non-hydrogenated form. More particularly, in the production of hydrogen storage means, it is possible to use hydrogenatable materials in their hydrogenated or non-hydrogenated form.

The storage of hydrogen (hydrogenation) can be effected at room temperature. Hydrogenation is an exothermic reaction. The heat of reaction that arises can be removed. By contrast, for the dehydrogenation, energy has to be supplied to the hydride in the form of heat. Dehydrogenation is an endothermic reaction.

In a hydrogenated first state, the compact has a greater second volume than in a dehydrogenated second state.

The first material is especially in pulverulent form (i.e. in the form of particles) before the production of the compact.

The particles especially have a particle size x50 of 20 μm [micrometers] to 700 μm, especially of 50 μm to 300 μm. What is meant here by x50 is that 50% of the particles have an average particle size equal to or less than the value mentioned. Average particle size in the present context is the particle size based on weight. What is reported here is the particle size of the hydrogenatable material before it is subjected to hydrogenation for the first time. During the storage of hydrogen, stresses occur in the material, which can lead to a decrease in the x50 particle size over multiple cycles.

This reduction in the particle size can especially firstly be prevented in the compact by the second material, the binder. Secondly, the second material fixes the particles in the compact.

More particularly, the multitude of compacts comprises at least 50% by volume, especially at least 75% by volume, preferably at least 90% by volume, of the bulk material.

The bulk material may additionally comprise at least one compressible third material disposed at least in interstices between the multitude of compacts. The third material may compensate for any expansion in volume of the multitude of compacts during absorption of hydrogen as a result of compression.

More particularly, the third material comprises, for example, a graphite, especially an expanded graphite.

More particularly, at least the second material has a melting temperature that differs by at most 20 Kelvin, especially by at most 10 Kelvin, from a highest operating temperature of the hydrogen storage device. Thus, if operating temperatures of not more than 50 degrees Celsius are attained, preference is given to selecting a second material that has a melting temperature of not more than 70 degrees Celsius.

The melting temperature of the second material here may also be lower than the highest operating temperature.

The operating temperature may especially, according to the application and the first material used, be between 40 and 140 degrees Celsius, especially between 40 and 80 degrees Celsius. In the case of use of high-temperature hydrides, much higher operating temperatures may also be envisaged.

The selection of the second material in this way enables softening of the second material in each cycle of hydration and/or dehydration. This softening enables new formation of the cohesive bond at each instance between the first material and the second material but within the compact and especially also between the compacts.

More particularly, it is thus also possible to counteract or compensate for the effect of further segregation of the particles of the first material. Typically, the particles of reduced size would become detached from a compact and migrate downward with gravity within the container. Interstices between the compacts would thus possibly be filled by the first material, such that it would no longer be possible to compensate for an expansion in volume of the multitude of compacts during absorption of hydrogen, for example by compression, for example of a third material otherwise provided in the interstices. This expansion in volume for which there is no (sufficient) compensation could cause local stresses in the container and hence lead at least to damage to the container.

More particularly, the second material has a melting temperature higher than the highest operating temperature.

At least one compact of the multitude of compacts may have a cylindrical shape. A cylindrical shape is especially producible in a particularly simple manner by pressing.

It is preferable, however, that at least one compact, especially a maximum number of the multitude of compacts, preferably all compacts, have a spherical shape. The spherical shape enables a particularly high packing density of the bulk material, such that a particularly effective hydrogen storage device can be provided. However, for known reasons, a spherical shape is difficult to produce by pressing.

A densest sphere packing (i.e. the highest packing density of spheres) is the geometric arrangement of an infinite number of spheres of the same size in 3-dimensional space in such a way that these merely touch one another and do not overlap and leave minimal remaining empty space. Such an arrangement is the result when many spheres are stacked in layers. Within one layer, each sphere is in contact with six neighboring spheres. The packing density of a densest sphere packing is about 74%.

In the present case, in particular, a packing density of the compacts of at least 60%, especially of at least 65%, preferably of at least 67%, has been attained.

More particularly, at least one compact of the multitude of compacts, especially a maximum number of the multitude of compacts, preferably all compacts, has a shape having a second volume, where each point on a surface of the shape is disposed at a distance of not more than 5%, especially not more than 2%, preferably not more than 1%, of a diameter of a spherical shape likewise having the second volume from the sphere surface of the spherical shape.

More particularly, the compact thus has a shape approximating as far as possible to a spherical shape.

More particularly, each compact of the bulk material in the non-hydrogenated state has a second volume of at least 10 mm$^3$ [cubic millimeters] and at most 1000 mm$^3$.

More particularly, it is possible to use a bulk material in which all compacts have in each case an equal second volume or in which individual compacts have different second volumes.

Further proposed is a use of a compact as bulk material for a hydrogen storage device (especially as described above). The compact comprises at least a first material capable of storing hydrogen and a second material as binder for the first material that was in pulverulent form before the production by compression.

The details relating to the hydrogen storage device apply equally to the compact and vice versa.

Further proposed is a method of producing a hydrogen storage device (especially as described above). The method comprises at least the following steps:
a) providing a container having a first volume and at least one opening;
b) filling the first volume via the at least one opening with at least one bulk material, wherein the bulk material comprises at least a multitude of compacts produced by compression, wherein each compact comprises at least a first material capable of storing hydrogen and a second material as binder for the first material that was in pulverulent form before the production by compression.

More particularly, the first volume in step b) may additionally be filled with at least one compressible third material via the opening, wherein the third material is disposed at least in interstices between the multitude of compacts. The third material may especially compensate by a compression for any expansion in volume of the multitude of compacts during absorption of hydrogen. The third material in the form of a network may contribute to increasing the thermal conductivity of the bulk material and/or accelerate the kinetics of hydrogen absorption and release.

More particularly, a packing density of the multitude of compacts in the first volume can be adjusted via a change in shape of a compact of at least a portion of the multitude of compacts. More particularly, the packing density can be adjusted via controlled supply of differently shaped compacts during the pouring (i.e. during the filling into the container).

The details relating to the method apply equally to the hydrogen storage device and the compact, and vice versa.

It should be noted by way of precaution that the ordinal numerals ("first", "second", . . . ) used here serve primarily (merely) for distinction of multiple articles or parameters of the same kind, i.e., more particularly, no dependence and/or sequence of these articles or parameters with respect to one another is necessarily defined. Should any dependence and/or sequence be required, this is explicitly stated or is obvious to the person skilled in the art on study of the configuration specifically described.

Figure 2:
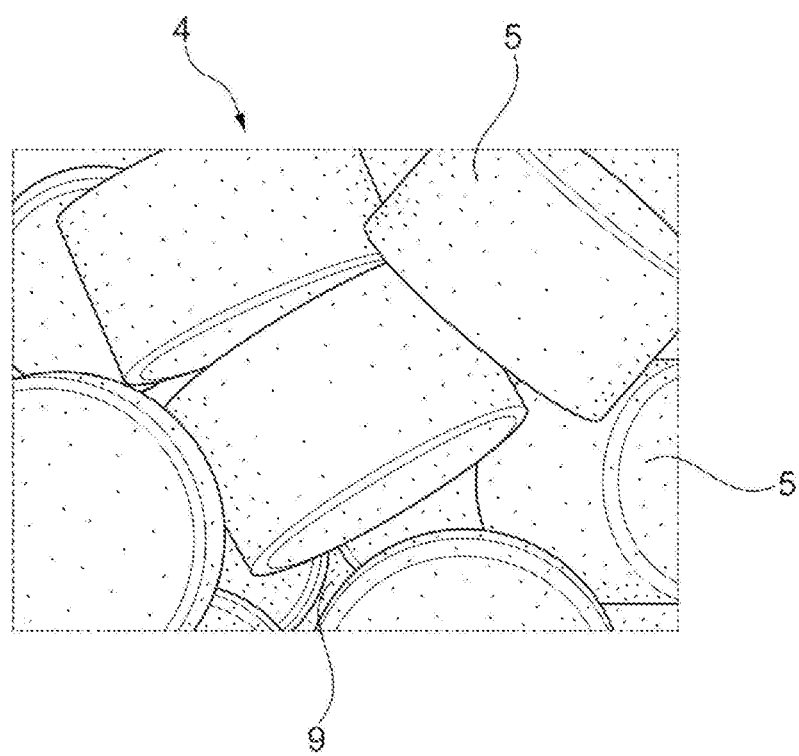
Figure 3:
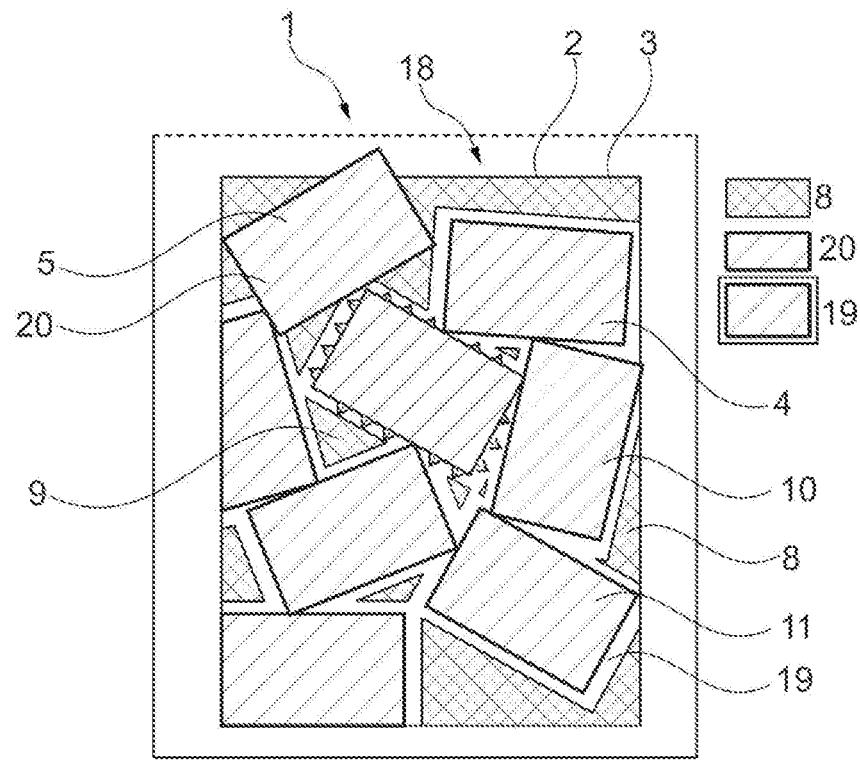
Figure 4:
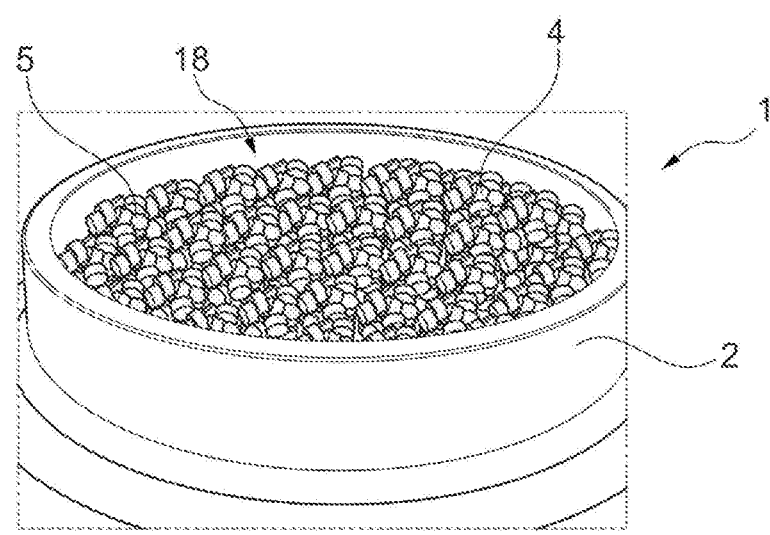
Figure 5:
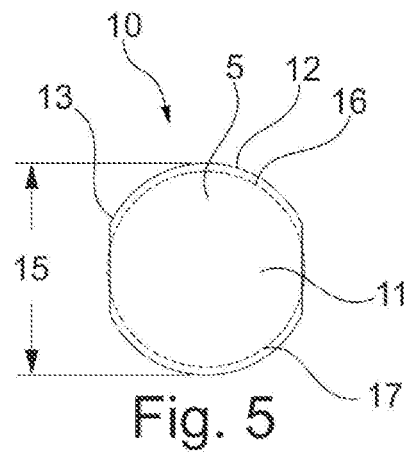
Figure 6:
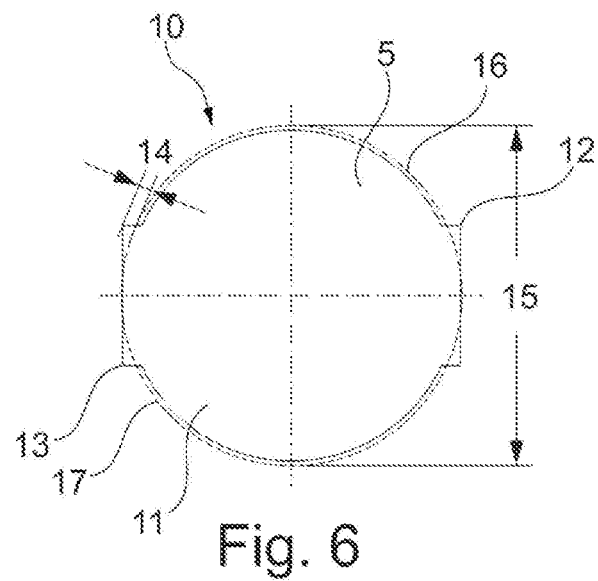

The invention and the technical environment are elucidated in detail hereinafter with reference to the figures. It should be pointed out that there is no intention to restrict the invention by the working examples shown. More particularly, unless explicitly stated otherwise, it is also possible to extract partial aspects of the matter elucidated in the figures and combine it with other constituents and findings from the present description and/or figures. More particularly, it should be pointed out that the figures and especially the size ratios represented are merely schematic. Identical reference numerals refer to identical articles, such that the elucidations from other figures can be consulted additionally if necessary. The figures show:

FIG. 1: a bed comprising a multitude of compacts;
FIG. 2: a detail of the bed according to FIG. 1;
FIG. 3: a hydrogen storage device in a side view;
FIG. 4: a hydrogen storage device in a perspective view;
FIG. 5: a first embodiment of a shape of a compact in a side view in section;
FIG. 6: a second embodiment of a shape of a compact in a side view in section; and
FIG. 7: a third embodiment of a shape of a compact in a side view in section.

FIG. 1 shows a bed comprising a multitude of compacts 5. FIG. 2 shows a detail of the bed according to FIG. 1. FIGS. 1 and 2 are described collectively hereinafter.

The bed shows a bulk material 4 consisting of a multitude of compacts 5. Each compact 5 comprises a first material 6 capable of storing hydrogen and a second material 7 as binder for the first material 6 that was in pulverulent form before the production by compression.

It is apparent that the compacts 5 are cohesively bonded to one another. This is achieved in that the second material 7 has a melting temperature that differs by not more than 20 Kelvin from the highest operating temperature of the hydrogen storage device 1. The selection of the second material 7 in this way enables softening of the second material 7 in each cycle of hydration and/or of dehydration. This softening enables new formation of the cohesive bond at each instance between the first material 6 and the second material 7 both within the compact 5 and between the compacts 5.

The compacts 5 used here all have a cylindrical shape 10 and in each case an equal second volume 11.

Interstices 9 form between the compacts 5, which can be filled in a hydrogen storage device 1 by a compressible third material 8 (see FIGS. 3 and 4).

FIG. 3 shows a hydrogen storage device 1 in a side view. FIG. 4 shows a hydrogen storage device 1 in a perspective view. FIGS. 3 and 4 are described collectively hereinafter.

The hydrogen storage devices 1 each comprise a container 2 having a first volume 3, wherein a bulk material 4 is disposed in the container 2. The bulk material 4 comprises at least a multitude of compacts 5 produced by compression, wherein each compact comprises at least a first material 6 capable of storing hydrogen and a second material 7 as binder for the first material 6 that was in pulverulent form before the production by compression.

The first material 6 capable of storing hydrogen is not matched to the shape of the container 2, provided for the arrangement of the first material 6 capable of storing hydrogen, but provided as bulk material 4. The bulk material is filled via an opening 18 into the container 2 of virtually any shape and is arranged therein. Interstices 9 are formed between the compacts, which are variable in relation to their size in the course of incorporation and release of hydrogen for compensation of the change in size of the compacts 5.

The bulk material 4 additionally comprises at least one compressible third material 8 which is disposed in the interstices 9 between the multitude of compacts 5. The third material 8 may compensate by a compression for an expansion in volume of the multitude of compacts 5 during absorption of hydrogen (see FIG. 3).

The compacts 5 used here all have a cylindrical shape 10 and in each case an equal second volume 11. In a hydrogenated first state 19, the compact 5 has a greater second volume 11 than in a dehydrogenated second state 20. The increase in the second volume in the container 2 is illustrated by a compact 5 and in the legend.

Figure 7:
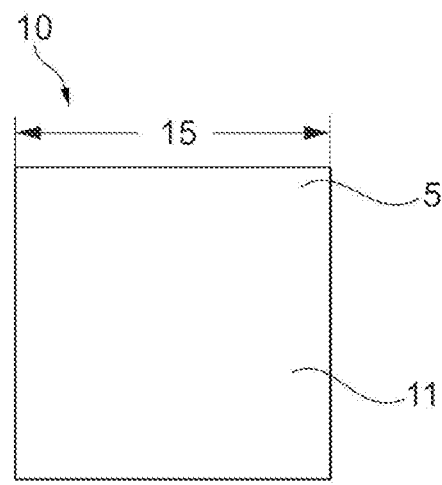

FIG. 5 shows a first embodiment of a shape 10 of a compact 5 in a side view in section. FIG. 6 shows a second embodiment of a shape 10 of a compact 5 in a side view in section. FIG. 7 shows a third embodiment of a shape 10 of a compact 5 in a side view in section. FIGS. 5 and 7 are described collectively hereinafter.

It is preferable that a compact 5 has a spherical shape 16. The spherical shape 16 enables a particularly high packing density of the bulk material 4, such that it is possible to provide a particularly effective hydrogen storage device 1. However, a spherical shape 16, for known reasons, is difficult to produce by pressing.

Therefore, compacts 5 having a shape 10 and a second volume 11 are produced, wherein each point 12 on a surface 13 of the shape 10 is disposed at a distance 14 of not more than 5% of a diameter 15 of a spherical shape 16 likewise having the second volume 11 from the sphere surface 17 of the spherical shape 16. More particularly, the compact 5 thus has a shape 10 approximating as far as possible to a spherical shape 16 (see FIGS. 5 and 6) indicating a spherical shape 16 of equal second volume 11.

FIG. 7 shows a compact 5 having a cylindrical shape 10 in a side view. The compact 5 has a diameter 15 and a second volume 11.

LIST OF REFERENCE NUMERALS 1 hydrogen storage device
2 container
3 first volume
4 bulk material
5 compact
6 first material
7 second material
8 third material
9 interstice
10 shape
11 second volume
12 point
13 surface
14 distance
15 diameter
16 spherical shape
17 sphere surface
18 opening
19 first state
20 second state

The invention claimed is:

1. A hydrogen storage device, at least comprising a container having a first volume, with a bulk material disposed in the container, wherein the bulk material comprises at least a multitude of compacts produced by compression, wherein each compact comprises at least a first material capable of storing hydrogen and a second material as binder for the first material that was in pulverulent form before the production by compression, wherein interstices are formed between the compacts, which, in the course of intercalation and release of hydrogen, are variable in size to compensate for the change in size of the compacts.

2. The hydrogen storage device as claimed in claim 1, wherein the multitude of compacts comprises at least 50% by volume of the bulk material.

3. The hydrogen storage device as claimed in claim 1, wherein the bulk material comprises at least one compressible third material disposed at least in interstices between the multitude of the compacts; wherein the third material compensates by compression for an expansion in volume of the multitude of compacts during absorption of hydrogen.

4. The hydrogen storage device as claimed in claim 1, wherein at least the second material has a melting temperature that differs by not more than 20 Kelvin from a highest operating temperature of the hydrogen storage device.

5. The hydrogen storage device as claimed in claim 4, wherein the second material has a melting temperature higher than the highest operating temperature.

6. The hydrogen storage device as claimed in claim 1, wherein at least one compact of the multitude of compacts has a cylindrical shape.

7. The hydrogen storage device as claimed in claim 1, wherein at least one compact of the multitude of compacts has a shape having a second volume, wherein each point on a surface of the shape is disposed at a distance of not more than 5% of a diameter of a spherical shape likewise having the second volume from the sphere surface of the spherical shape.

8. The hydrogen storage device as claimed in claim 1, wherein each compact in the non-hydrogenated state has a second volume of at least 10 mm³[cubic millimeters] and at most 1000 mm³.

9. A method comprising using a multitude of compacts as a bulk material for a hydrogen storage device, wherein each of the compacts comprises at least a first material capable of storing hydrogen and a second material as binder for the first material, wherein interstices between the compacts vary in size during intercalation and release of hydrogen to compensate for change in size of the compacts.

10. A method of producing a hydrogen storage device, at least comprising the following steps:
   a) providing a container having a first volume and at least one opening; and
   b) filling the first volume via the at least one opening with at least one bulk material, wherein the bulk material comprises at least a multitude of compacts produced by compression, wherein each compact comprises at least a first material capable of storing hydrogen and a second material as binder for the first material that was in pulverulent form before the production by compression, and wherein interstices are formed between the compacts, which, in the course of intercalation and release of hydrogen, are variable in size to compensate for the change in size of the compacts.

11. The method as claimed in claim 10, wherein the first volume is additionally filled in step b) with at least one compressible third material via the opening, wherein the third material is disposed at least in interstices between the multitude of compacts; wherein the third material compensates by compression for an expansion in volume of the multitude of compacts during absorption of hydrogen.

12. A method as claimed in claim 10, wherein a packing density of the multitude of compacts in the first volume is established via a change in shape of a compact of at least a portion of the multitude of compacts.

* * * * *